May 5, 1970     W. LIPP     3,509,619

MULTI-HEAD DRILLING MACHINE WITH HEAD CHANGING MEANS

Filed Nov. 15, 1967     5 Sheets-Sheet 1

INVENTOR.
WILLI LIPP

BY

ATTORNEYS

INVENTOR.
WILLI LIPP
BY

ATTORNEYS

INVENTOR.
WILLI LIPP

May 5, 1970     W. LIPP     3,509,619

MULTI-HEAD DRILLING MACHINE WITH HEAD CHANGING MEANS

Filed Nov. 15, 1967     5 Sheets-Sheet 5

INVENTOR.
WILLI LIPP
BY
McGlew & Toren
ATTORNEYS

United States Patent Office 3,509,619
Patented May 5, 1970

3,509,619
MULTI-HEAD DRILLING MACHINE WITH
HEAD CHANGING MEANS
Willi Lipp, Witten-Annen, Germany, assignor to
Rheinstahl Huttenwerke AG., Essen, Germany
Filed Nov. 15, 1967, Ser. No. 683,169
Claims priority, application Germany, Mar. 8, 1967,
R 45,459
Int. Cl. B23q 3/157
U.S. Cl. 29—568                                    14 Claims

ABSTRACT OF THE DISCLOSURE

A multi-head machine for drilling, reaming, threading and the like is comprised of a machine frame having a movable holder member positioned on it for securing individual heads in the working position and for moving them between a working position and a replacement position. On the opposite side of the frame from the holder member is a longitudinally extending magazine for storing the heads when not in use. A track is located along each side of the magazine and extends to the replacement position on the machine frame. One track is employed for removing working heads from the magazine and bringing them to the replacement position, while the other track is utilized for removing the working heads from the replacement position and moving them into a storage position in the magazine. In operation as a head is removed from the replacement position onto the track, a new head is inserted into the holder member in the replacement position and the head is then moved to its working position on the machine. At the same time the removed head is moved along the track to a storage position on the magazine which contains the next head to be employed. As the head is inserted into the storage position in the magazine, the next head is displaced onto the opposite track and then is transported to the replacement position to await the completion of the drilling or working operation when it will be ready to replace the head in the holder member for the next operation to be performed. The transport means on the opposite tracks operate together to provide the insertion-withdrawal operation at both the storage position in the magazine and at the replacement position on the machine frame. In one embodiment, the member holding the working head is arranged to move vertically from a lower working position to an upper replacement position with the magazine extending in a horizontal plane from the replacement position. In another arrangement, a pair of working heads can be arranged on opposite sides of a bench holding the work piece with the heads movable horizontally between the working position and the replacement position and with the magazine containing the replacement heads horizontally aligned with the working and replacement positions. In the transport means, members may be provided on each of the tracks for inserting and withdrawing the working heads or, as an alternative, a member may be provided on one track for withdrawing the working head from its storage position and inserting it into the replacement position.

SUMMARY OF THE INVENTION

This invention is directed to machines used for drilling, boring, reaming and the like which employ a plurality of replaceable heads and, more particularly, it is directed to an arrangement of the machine frame and a magazine for holding the replacement heads when not in use which affords a simplified head replacement operation with a minimim time involved in the changeover.

Drilling machines employing a plurality of working heads with automatic replacement of the heads is known. In such machines, the replaceable heads are held in one or two storage magazines extending laterally from the work table of the machine. Special brackets are provided in the storage magazines for holding the working heads. However, these brackets prevent the continuous aligned introduction and removal of the working heads into the machine. To overcome this disadvantage, the replacement heads have been stored in magazines arranged around the machine frame. However, both of these designs have the drawback such that when a replacement working head is moved into the working position on the machine, the entire magazine must be rotated and a considerable amount of power is required. Moreover, the time required to replace the working head is quite lengthy because of the operations involved in positioning the magazine and replacing the head, and as a result, a considerable time period elapses between the working operations. The lost time in such operations is increased where a number of working head changes are required for one workpiece and where the heads are not positioned successively in the storage magazine.

Accordingly, one of the primary objects of the invention is to provide a means for transporting the working heads for a drilling machine or the like in a continuous straight line operation between a storage magazine and the replacement position of a holder member on the machine frame.

Another object of the invention is to maintain the magazine stationary and to move only the head to be placed into the working position on the machine frame and to remove the previously used head and return it to the magazine.

Still another object of the invention is to arrange the magazine whereby a replacement head is in position to be inserted into the holder member on the machine frame at the termination of the machining operation.

Moreover, another object of the invention is to provide a simple means for transporting the heads into the replacement position and for returning previously used heads into the storage magazine.

A further object of the invention is to afford means for withdrawing a replacement head from its storage position in the magazine while at the same time moving the previously used head into its vacated storage position.

Still a further object of the invention is to provide an arrangement which is compact and does not interfere with the working operation of the machine itself.

Another object of the invention is to provide a dual machine operation wherein similar working and head replacement operations can be performed on opposite sides of a bench holding the workpiece.

Another object of the invention is to supply a combined machine and storage magazine arrangement which is simple in construction, easy to operate, and reduces the overall time involved in replacing heads in a multi-head machine.

Accordingly, in the present invention, the magazine for the heads extends longitudinally from the replacement position on the machine frame. The heads are serially arranged in the magazine, and transport means including tracks are provided for removing individual heads from the magazine and positioning them in the holder member on the machine frame for replacing a previously used head.

In accordance with the teaching of the present invention, the magazine for storing the heads and the means for transporting the heads between the magazine and the machine frame may be arranged in a number of different ways. In a preferred embodiment, a track is provided along each side of the magazine and extending to the replacement position of the heads on the machine frame. Each track has a carriage or similar device for transporting the heads. One track is used to remove the heads from the magazine and transport them to the replacement position while the other track is employed to receive the heads from the replacement position after they have been used and convey them into a storage position in the magazine. A particular advantage of this arrangement resides in replacing, in the magazine, the next head to be used by the previously used head.

In the embodiment employing a track on each side of the magazine, another advantage is achieved by utilizing a common drive for the carriages along both of the tracks. With the common drive, the carriages are always aligned opposite one another, whether on the magazine portion of the track or in the replacement position on the machine frame. Each of the carriages is equipped with a transverse drive for removing and inserting the working heads into both the storage position on the magazine and the replacement position on the machine frame. In this arrangement, as the replacement head is withdrawn from the storage position, the previously used head is moved into its place and, after the replacement working head is moved to the replacement position on the machine frame, it is inserted into the holder member and in so doing the previously used head is displaced onto the opposite track for subsequent removal to the magazine. In this arrangement, there is always a replacement head in position for the next machining operation.

As an alternative, each of the carriages may have its own drive. In this arrangement, to assure the simultaneous and aligned operation of the carriages, their transport means are interrelated so that they will operate only when the carriages have been disposed in aligned positions on the opposite tracks.

In another embodiment of the apparatus for transporting the heads the means for removing the head from the storage position and inserting it into the holder member in the replacement position on the machine frame may be located on one carriage only. In this arrangement, the working heads are provided with an interlocking flange and groove arrangement, and as the carriage moves along the track, the member for withdrawing the working head slides into the groove on the head in the storage position. At the same time on the opposite track, a previously used head is engaged in a similar groove on the opposite side of the replacement head. As the replacement head is withdrawn from the storage position in the magazine, the previously used head is moved into the storage position due to the interlocking groove arrangement. In the next step as the carriage moves toward the replacement position on the machine frame, the replacement head slides out of engagement with the previously used head now in the storage position and is transported into position for the next changeover of heads. On the machine frame the previously used head moves upwardly within the holder member from the working position to the replacement position and interengages the groove and flange arrangement on the replacement head. The replacement operation is similar to that carried out in the magazine, as the replacement head is inserted into the holder member and the previously used head is moved out onto the opposite track. Next, as the previously used head is moved rearwardly from the machine frame to the magazine, it disengages from the groove on the head now in the holder member and another cycle of machine operation and head replacement is ready to commence.

In the embodiments discussed thus far, only one head has been used at a time for performing machining operations on a workpiece. It will be appreciated that the present invention can also be employed using a pair of oppositely disposed heads performing machining operations on the same workpiece. In such an arrangement, the working heads are movable from the working piece to replacement positions for changing the heads. In one embodiment, the magazines extend axially rearwardly from the replacement position in line with the working position and the tracks run along the magazine between the replacement position and the respective storage positions on the magazine. The operation of this arrangement is similar to that previously described, the basic difference being in the disposition of the storage magazine relative to the working position of the heads in the machine frame.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
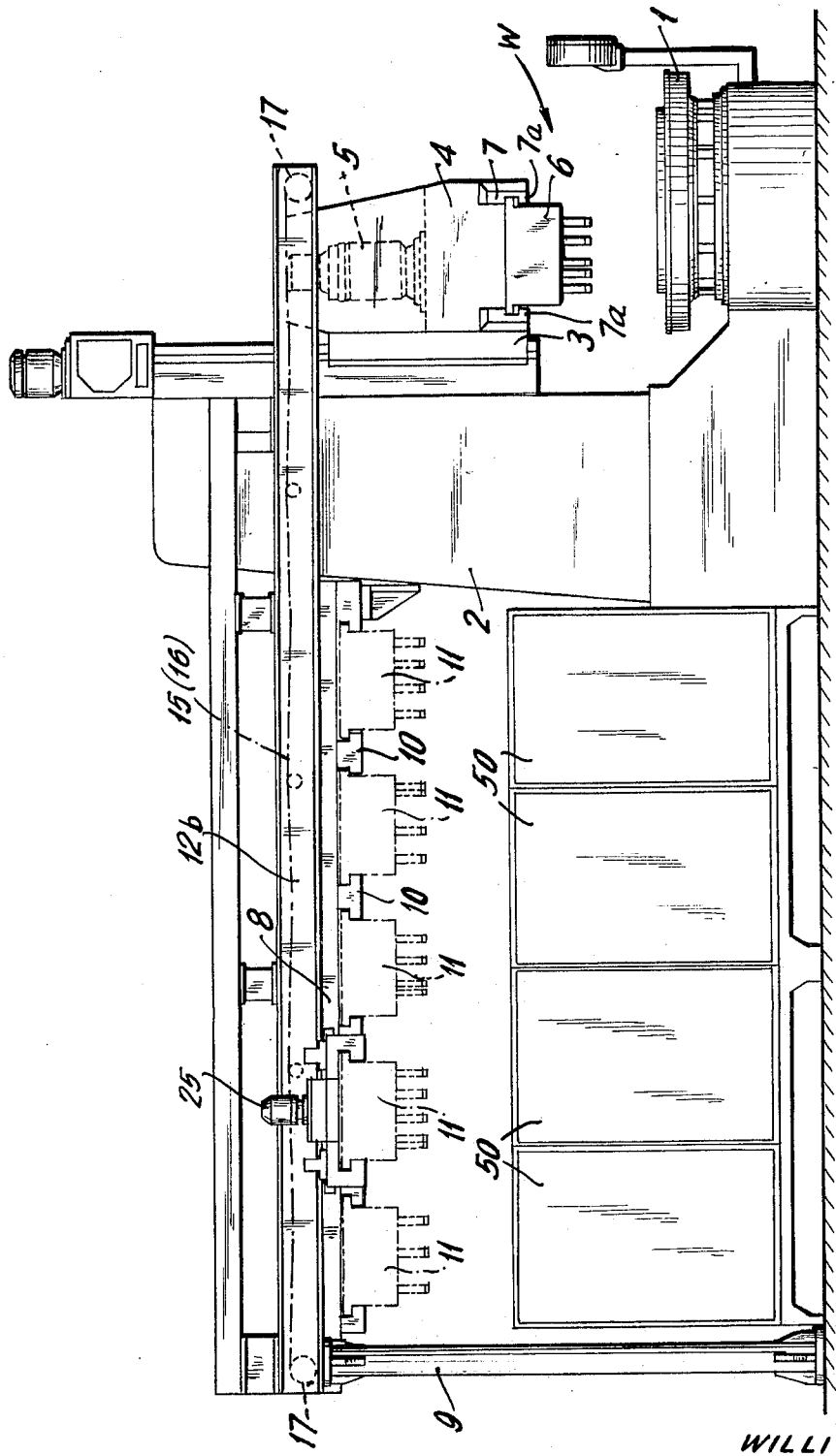
FIG. 1 shows a side view of a drilling machine and storage magazine embodying the present invention.
Figure 2:
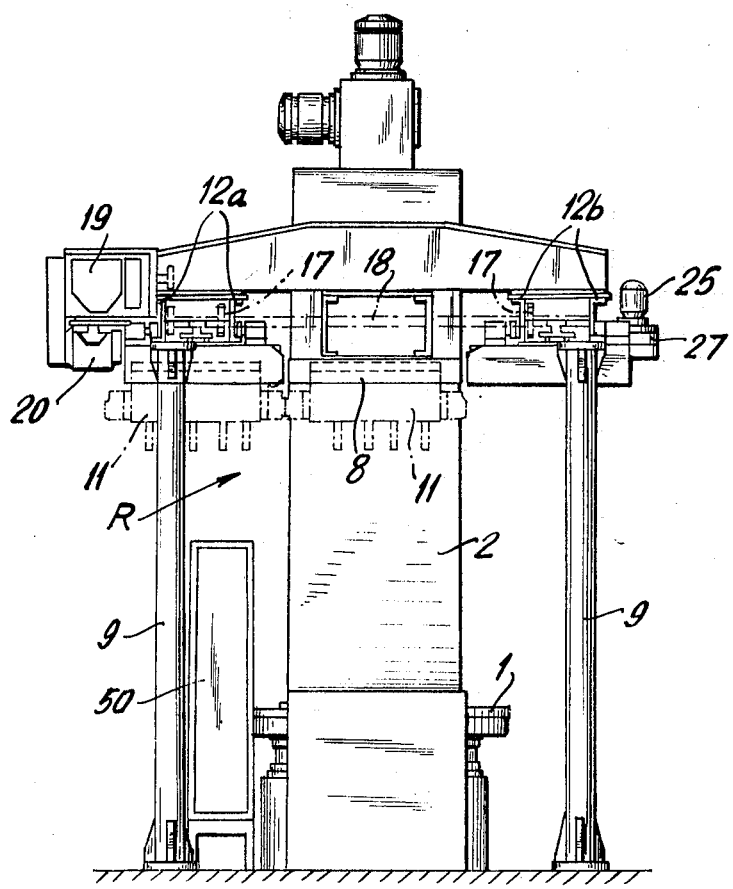
FIG. 2 is a rear side view taken from the magazine end of the arrangement shown in FIG. 1.
Figure 3:
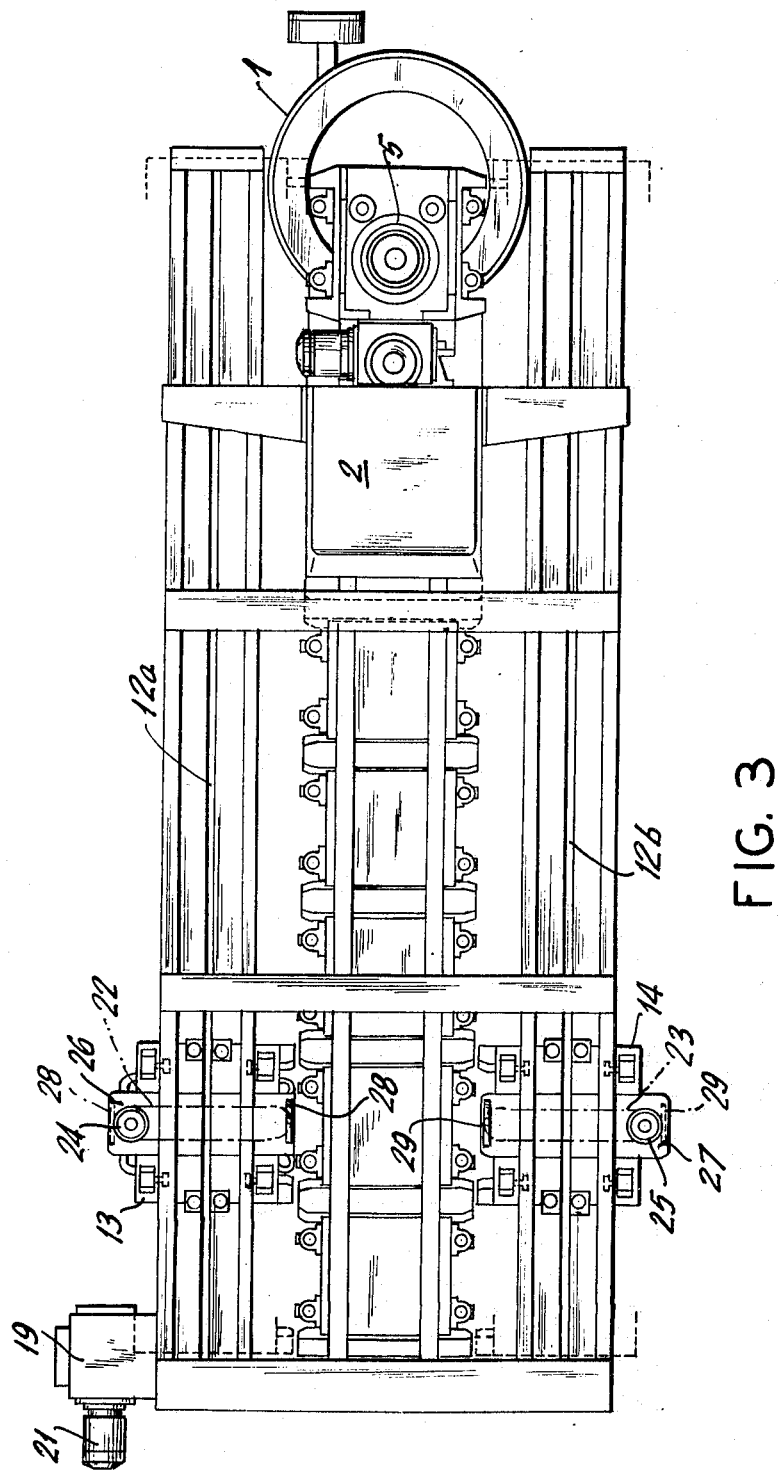
FIG. 3 is a top view of the machine arrangement shown in FIG. 1.

In FIGS. 1 to 3, a multi-head drilling machine is shown having a circular table 1 arranged to receive a workpiece. The table is positioned at the lower end of a vertically arranged machine standard or frame 2. A drilling unit 3 is secured to the machine frame and is vertically positionable between a working position W shown in FIG. 1 and a replacement position R shown in FIG. 2. The drilling unit 3 comprises a reducing gear 4 with a drive motor 5 for operating a head 6 positioned in a holder member 7. For purposes of the description, the portion of the machine frame having the drilling unit 3 will be identified as its front side while the opposite portion will be designated as its rear side.

Extending longitudinally from the rear side of the machine frame 2 is a magazine 8 for storing the heads for the drilling machine when they are not being used. The magazine is supported at one end by the machine frame 2 and at the other end by a pair of vertical supports 9. The magazine 8 has a plurality of storage positions 10. In this description, the heads for the machine are identified by the reference numerals 6 and 11. Reference numeral 6 identifies a head in position in the drilling unit 3 or in movement for the drilling unit to the magazine 8. The reference numeral 11 indicates a head either in the storage position in the magazine or in the process of being transported from the magazine to the drilling unit. The construction of the heads 6 and 11 is the same. The number of storage positions 10 in the magazine 8 is limited only by the available space in the magazine. In the holder member 7 and in the storage positions 10 the heads 6, 11 are supported by flanges 7a, 10a, respectively.

Tracks 12a, 12b are located on opposite sides of the magazine and extend for the length of the magazine and to the replacement position R on the machine frame 2. Each of the tracks 12a, 12b has a carriage 13, 14 for transporting working heads 6, 11 between the storage positions in the magazine and the replacement position on the machine frame. During operation, as can be noted in the drawing, the carriages are located opposite one another on the tracks 12a, 12b and a common drive mechanism conveys them along the tracks. The drive mechanism is comprised of chains 15 and 16, sprocket wheels 17 and a drive shaft 18 located at the rear of the magazine, see FIG. 2, which in combination with a fast-slow motion transmission device 19, powered by electric motors 20 and 21, assures that the two carriages are always aligned opposite one another along the track. As an alternative, the carriages 13 and 14 may be moved along the track by use of a continuous hydraulic drive or a hydraulic or pneumatic cylinder secured to the carriages for joint or individual operation.

Each of the carriages 13, 14, has a transverse feed chain device 22, 23 for moving the heads between the carriages and the storage and replacement positions in the magazine and the machine frame, respectively. The transverse feed chain devices 22 and 23 are powered by means of electric motors 24, 25 through reducing gears 26, 27. Alternatively, the movement of the heads between the carriage on the track and the magazine or the machine frame may be accomplished by using hydraulic or pneumatic cylinders or other mechanical devices.

The drilling machine as shown in FIGS. 1–3 operates in the following manner: The head 6 of a multi-spindle type, is clamped into the holder member 7 of the drilling unit 3 and coupled with the gear 4 for operation by the motor 5. In its operating or working position W, the head 6 is located immediately above the table 1 holding the workpiece, and it is automatically controlled, by means located in the control boxes 50 disposed below the magazine 8, see FIG. 1. After the individual operation by the head 6 located in the holder member 7 is completed, the drilling machine is program-controlled to automatically move the holder member 7 and its head 6 into the upper replacement position R which is in a plane with the working heads 11 located in the magazine 8. In the replacement position, the carriage 14, with its replacement head 11, is located opposite the working head 6 which has just completed its operation, as shown in FIG. 2. The replacement head 11 is pushed into position in the holder member 7 by means of a transfer member 29 located on the transverse feed chain 23. As the head 11 is moved into the holder member 7, the head 6 which has just completed its operation is pushed into the carriage 13 located on the opposite track. The replacement head is then clamped and coupled into the drilling unit 3 and moved downwardly into its working position W. At the same time, the carriages 13, 14 on the tracks 12a, 12b move rearwardly along the track away from the replacement position to the location of the next head 11 to be used in the drilling operation. The carriages 13, 14 are aligned on either side of the storage position holding the next head 11 to be used.

Similar to the operation of the drilling unit 3 between the working position W and the replacement position R, the movement and positioning of the carriages on the track is program-controlled by a combination of switch cams (not shown) operated in a binary code for positioning the carriages opposite the next head 11 to be used. The previously used working head 6 located in the carriage 13 is then moved by means of the transfer member 28 on the transverse feed chain 22 into the storage position 10 and, as a result, it moves the next head 11 into the opposite carriage 14. In other words, there is an exchange between the carriages 13 and 14 of the head 6 which has just completed its operation in the working position and the next head 11 which is to be inserted into the drilling unit 3. Due to the special arrangement of the transfer members 28, 29 on the feed chains 22, 23, in the vertex of the radius of curvature, the speed of the working heads to be displaced increases sinusoidally from zero to nominal speed in one end position and decreases again similarly in the other end position so that a fast-slow motion transmission is not necessary. With the next head 11 to be used located in carriage 14, the two carriages 13 and 14 are again moved along the tracks 12a, 12b to the replacement position R on the machine frome 2. Accordingly, when the drilling operation is completed, the holder member 7 with its head 6 is again moved upwardly to the replacement position and the operation of removing the previously employed head 6 and replacing it by the next head to be used is accomplished in the same manner. The clamping and coupling of the working heads is effected in a generally known manner and it does not need to be described in detail as part of the present invention.

Figure 5:
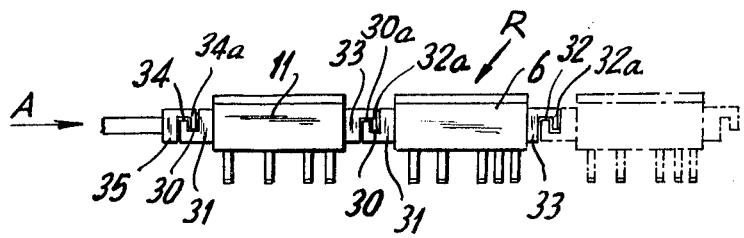
FIG. 5 is a partial transverse section taken along line V—V of FIG. 4 indicating the means for replacing working heads in the machine.
Figure 6:
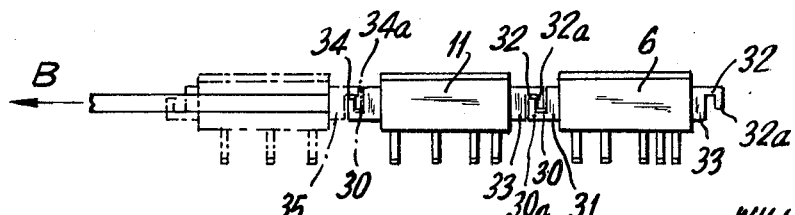
FIG. 6 is a partial view taken along line VI—VI in FIG. 4 showing an arrangement, generally similar to that in FIG. 5, for placing heads into the magazine.
Figure 4:
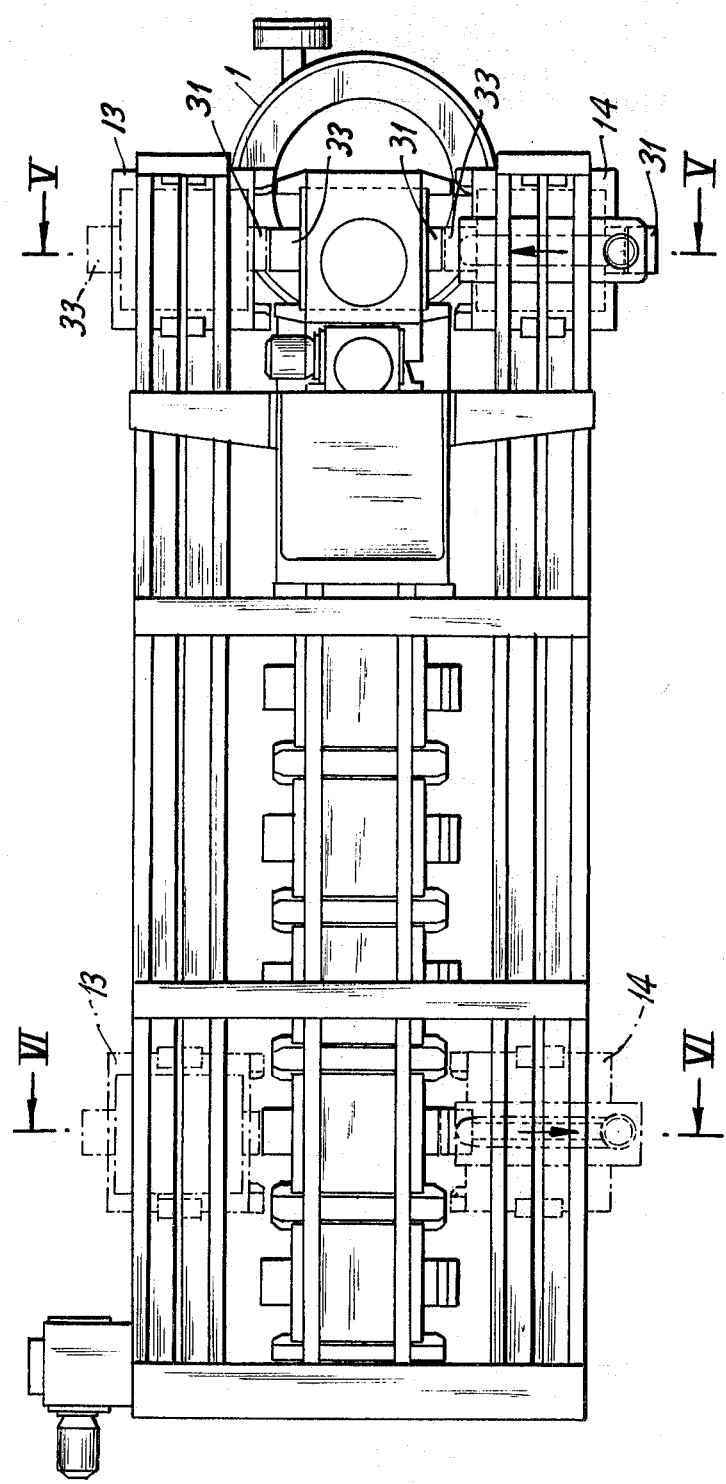
FIG. 4 is a top view similar to that shown in FIG. 3, however, with a different transport device for the movement of working heads between the magazine and the machine.

Another means for transporting the heads 11 from the storage positions 10 into the replacement position R and from the replacement position back to the storage position is shown in FIGS. 4–6 which is somewhat different than that just described for FIGS. 1–3. It will be noted in FIGS. 5 and 6 that a projection is located on each of the opposite sides of the heads 6, 11 facing the opposite tracks, each projection has a groove and flange arrangement, one facing upwardly on one side of the head and downwardly on its opposite side.

For purposes of explanation, it will be assumed that the head 6 has just completed its machining operation and is being moved from the working position W upwardly into the replacement position R, with the replacement head 11 located in the carriage 14 at the replacement position.

Referring now to FIG. 5, as the working head 6 enters the replacement position and while still within the holder member 7, the upwardly facing groove 30 and its adjacent flange-like member 30a of the projection 31 interengage the downwardly facing groove 32 and flange element 32a of the projection 33 on the replacement head 11 located in the carriage 14. At the same time, a transfer member 35 having a downwardly directed groove 34 and flange 34a, similar to that on the head is engaged with the juxtaposed projection 31 on the head 11 for moving it into the replacement position in the holder member 7. As the transfer member 35 is moved in the direction of the arrow A, the head 6 which has completed its drilling operation is moved into the carriage 13 (not shown in FIG. 5) and the replacement head 11 is moved into the holder member 7. After the head 11 now in the holder member 77 is clamped and coupled, it is ready to be moved downwardly into the working position. However, before it can be moved downwardly, the carriages 13 and 14 on the opposite sides of the replacement position must be moved rearwardly toward the storage positions in the magazine releasing the transfer member 35 from the projection 31 on the one side of the head 11 and the previously used working head 6 from the projection 33 on the opposite side of the head so that the head is free to be moved downwardly.

As the previously used head 6 is moved rearwardly on the carriage 13, its upwardly directed flange 30a and groove 30 slide through the similar but downwardly directed flange and grooves on the heads in the storage positions 10 until the carriage arrives at the position on the next head to be moved to the replacement position. In this position, the previously used head 6 is in interlocking engagement by means of its groove 30 and flange 30a with the oppositely directed groove and flange in the projection 33 of the head within the storage position, see FIG. 6. Similarly, at the opposite side of the storage position the transfer member 35 on the carriage 14 is interengaged with the upwardly directed groove and flange of the projection 31. Now an opposite movement takes place compared to the one in the replacement position with the transfer member 35 pulling the next head 11 into the carriage 14 and at the same time the previously used working head 6 is moved from the carriage 13 into the storage position 10 just vacated. When the next working head is finally positioned in the carriage 14, it is ready to be moved to the replacement position at the machine frame 3. The carriage 14 moves along the track and the projetcion 33 on the right side, was viewed in FIG. 6, slidingly disengages itself from the projection 31 on the previously used head now in the storage position. This procedure is repeated each time a head completes its operation until the drilling operations on the workpiece are completed. As with the operation described for FIGS. 1–3, the movement of the heads is program-controlled by means of control apparatus not shown in the drawings.

Figure 7:
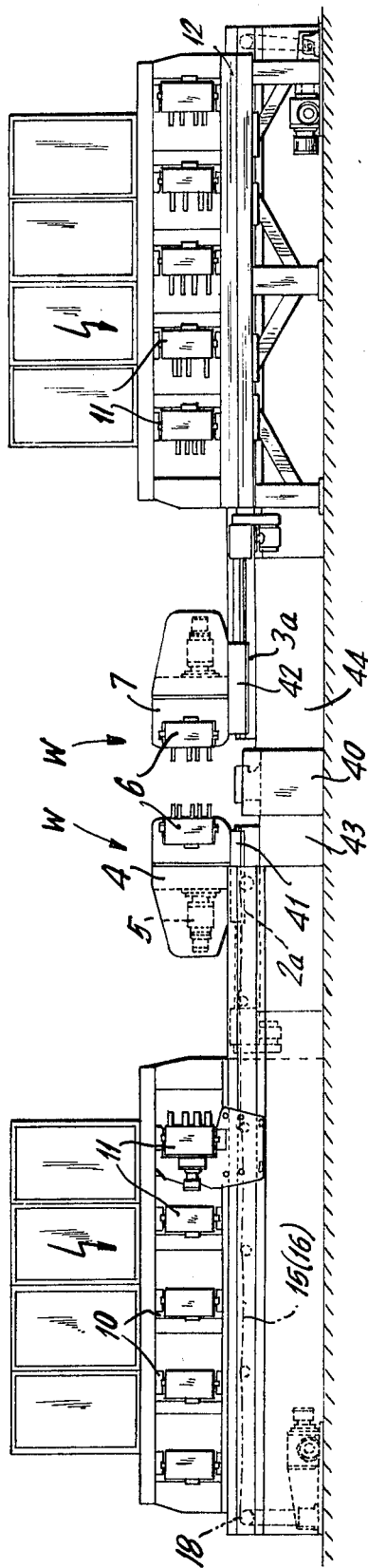
FIG. 7 is a side view of a dual setup of machines and magazines having an arrangement generally similar to that shown in FIG. 1.
Figure 8:
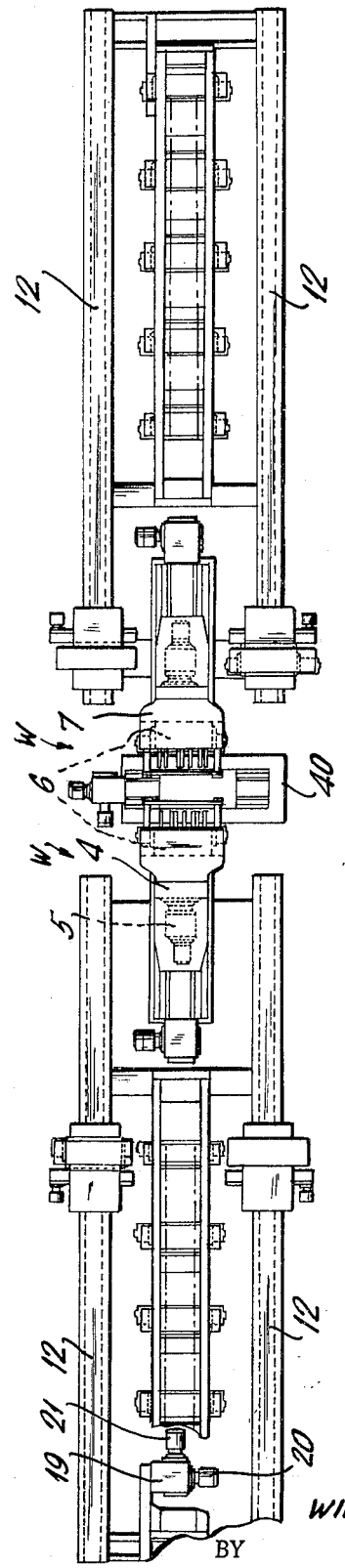
FIG. 8 is a top view of the setup shown in FIG. 7.

In FIGS. 7 and 8, another embodiment of the present invention is shown with a pair of oppositely directed drilling units 3a each mounted on a horizontally arranged machine standard or frame 43, 44. Similar reference numerals are used in FIGS. 7 and 8 to those previously used in FIGS. 1–3, except where noted. The machining units 3a are positioned in horizontally arranged slide units 41, 42 on opposite sides of a table 40 for holding the workpiece and for movement between the working position and the replacement position on the frame. As compared to the arrangement shown in FIG. 1, the drilling units 3a move in a horizontal direction between the working position shown in FIG. 7 and a replacement position located rearwardly toward the magazines. In this arrangement, the operation is generally similar to that previously described, with the drilling unit 3a being moved from the working position to the replacement position at the end of a drilling operation and the working heads being replaced within the holder member 7. There are some slight differences in the arrangement of the support means for the heads in the storage positions as compared to the embodiment in FIG. 1. However, as can be readily appreciated, the heads are removed between the storage positions and the replacement position in the same general manner as set forth above.

By means of the present invention, particularly the arrangement of the magazine and the movement of the working heads between the storage positions and the replacement position on the machine frame, it is possible to effect a continuous straight line feed of the heads. When the replacement of a head is required, it is only necessary to move two of the heads, one being inserted into the holder member 7 and the other being removed onto the track for replacement in a storage position 10 of the magazine. Since the replacement of the heads into the storage positions and the movement of the next head to be used to the replacement position takes place during the machining operation, there is no lost time involved. As a result, the total manufacturing time for one workpiece is considerably reduced, since, as a general rule, the time involved for each machining operation on a workpiece is considerably longer than that required to move a head from its storage position to the machine frame. The saving in time effected by this operation is especially noticeable when a multiple number of machining operations with different heads are required for one workpiece. Further, in the present arrangement, there is no special arrangement required for the heads in the magazine due to the way in which the use of the heads is programmed. As one head is removed from a storage position its place is taken by another head, each head does not have a designated storage position.

In special cases, additional machine frames and drilling units can be disposed about a single working position with the individual heads being arranged to operate at any desired angle with respect to the workpiece.

Another advantage exists in the low space required for the machine and since the magazine does not encroach upon the movement of the workpieces or of the heads on the machine frame. Because of the arrangement of the heads during operation, one being positioned in the replacement position while another is performing the drilling operation, the size of the magazine may be reduced since the total number of spaces required is less. Moreover, the electric control boxes 50 for the machine may be advantageously positioned either under the magazine as shown in FIGS. 1 and 2, or above the magazine as shown in FIGS. 7 and 8.

While specific embodiments of the invention have been shown and described in detail to illustrate the application of the inventive principles, it will be understood that the invention may be embodied otherwise without departing from such principles.

What is claimed is:

1. A multi-head machine for drilling, reaming, threading and the like, comprising a plurality of replaceable heads, a machine frame, a holder member mounted on said machine frame for holding said heads in a working position, means located on said frame for moving said holder member thereon between the working position and a head replacement position, a magazine extending from said machine frame and having a plurality of head storage positions, said magazine being stationary and having a longitudinally extending rectilinear axis, and means for transporting said heads between the storage positions in said magazine and the replacement position on said machine frame with the storage positions for the heads in said magazine being serially aligned along said axis.

2. A multi-head machine, as set forth in claim 1, wherein support members are provided in each of said storage positions for holding one of said heads therein, and said means for transporting said heads is arranged for inserting said head from one side of said magazine into their storage positions and for removing said heads from the opposite side of said magazine from their storage positions.

3. A multi-head machine for drilling, reaming, threading and the like, comprising a plurality of replaceable heads, a machine frame, a holder member mounted on said machine frame for holding said heads in a working position, means located on said frame for moving said holder member thereon between the working position and a head replacement position, a magazine extending from said machine frame and having a plurality of head storage positions, and means for transporting said heads between the storage positions in said magazine and the replacement position on said machine frame, said transport means comprising a track positioned on each side of said magazine and extending therefrom to the head replacement position on said machine frame.

4. A multi-head machine, as set forth in claim 3. wherein said transport means comprises means for removing said heads from the storage positions to said track and for inserting said heads from said track into said holder member in the replacement position on said machine frame.

5. A multi-head machine, as set forth in claim 4, wherein said transport means comprises a carriage positioned on each of said tracks, each said carriage being movably positionable along its said track, said carriages arranged to support and transport heads on said tracks.

6. A multi-head machine, as set forth in claim 5, wherein said transport means comprises means for moving said carriages along said tracks between said magazine and said replacement position on said machine frame.

7. A multi-head machine for drilling, reaming, threading and the like, comprising a plurality of replaceable heads, a machine frame, a holder member mounted on said machine frame for holding said heads in a working position, means located on said frame for moving said holder member thereon between the working position and a head replacement position, a magazine extending from said machine frame and having a plurality of head storage positions, means for transporting said heads between the storage positions in said magazine and the replacement position on said machine frame, said machine frame having a front side and a rear side with said holder member for holding said heads located on the front side thereof and being arranged to be vertically movable thereon, a worktable located on the front side of said frame, the working position of said head in said holder member positioned closely above said worktable and below the replacement position, said magazine having a rectilinear axis extending longitudinally in a horizontal plane from the rear side of said machine frame, said magazine having a plurality of serially arranged storage positions disposed along its axis with the working head storage positions disposed in a common plane with the replacement position on said machine frame, support members in said magazine at each storage position arranged to receive and support said working heads therein, said transport means comprising a track located on each side of said magazine and extending to the replacement position on said frame, a carriage disposed on each of said tracks, said carriages arranged to be disposed in opposed positions on opposite sides of said magazine, means for moving said carriages simultaneously along said track, means associated with one of said carriages for removing said heads from the storage position in said magazine and for inserting the head into the replacement position in said holder member on said machine frame, and means associated with the opposite carriage for removing said head from the replacement position in said holder member on said frame and for inserting the head into the storage position in said magazine.

8. A multi-head machine, as set forth in claim 7, wherein said magazine is supported at one end by said machine frame and at its opposite end by a pair of support legs.

9. A multi-head machine, as set forth in claim 7, wherein electric control means are positioned below said magazine.

10. A multi-head machine, as set forth in claim 7, wherein each of said heads is a multi-spindle drilling head.

11. A multi-head machine, as set forth in claim 5, wherein said carriage arranged for removing one of said heads from said magazine and inserting the head into the replacement position in said holder member on said machine frame comprises a transfer arm arranged transversely to the axial direction of said track and movable in the direction of said magazine, said arm having a downwardly directed flange at its end and a downwardly directed groove adjacent said flange, each of said heads having a laterally extending projection on the sides facing said tracks, said projection facing said arm having an upwardly directed flange at its outer end and an upwardly directed groove adjacent said flange, whereby, when said carriage is aligned on said track opposite one of said heads in a storage position the downwardly directed flange and groove of said arm slide over and interengage the corresponding upwardly directed groove and flange respectively on said head whereby said arm can withdraw said head laterally from said storage position in said magazine into said carriage on said track.

12. A multi-head machine, as set forth in claim 11, wherein the projection on the opposite side of said working head from said arm has a downwardly directed flange at its outer end and a downwardly directed groove immediately adjacent said flange whereby when one of said heads is positioned in said carriage on said track on the opposite side of said magazine from said transfer arm said downwardly directed flange and groove on said head in the storage position interengages the upwardly directed groove and flange on the adjacent working head in said carriage and as said transfer arm withdraws the head from the storage position into said carriage the other head is moved due to its interlocking engagement from its carriage on said opposite track into the storage position in said magazine, when said head secured by said transfer arm is moved in said carriage along said track it disengages from said other head located in said storage position therein.

13. A method of replacing heads in a multi-head machine for drilling, reaming, threading and the like, comprising the steps of securing a first head in an operative position in the machine, when the first working head has completed its operation moving it from its operative position to its replacement position, extracting the first head and at the same time inserting a second head, moving the second head into the operative position and placing it in operation while at the same time moving the first head to the storage position of the next head to be used, removing the next head to be used from its storage position and inserting the first head into the storage position vacated by the next head to be used, and moving the next head to be used into the replacement position where it is ready to replace the head in the operative position at the completion of its operation when it is moved into the replacement position.

14. A multi-head machine for drilling, reaming, threading and the like, comprising a plurality of replaceable heads, a machine frame, a holder member mounted on said machine frame for holding said heads in a working position, means located on said frame for moving said holder member thereon between the working position and a head replacement position, magazines extending from said machine frame and having a plurality of head storage positions, means for transporting said heads between the storage positions in said magazine and the replacement position on said machine frame, a worktable, a pair of machine frames positioned on opposite sides of said worktable, each of said frames having one said holder member disposed to move in a horizontal direction between the working position closely adjacent said worktable and the replacement position spaced remotely from said worktable, one said magazine extending horizontally from each of said machine frames in alignment with the axis of the head in the working position, said transport means comprising a track located on each side of said magazine and extending to the replacement position on said frame, a carriage disposed on each of said tracks, each carriage arranged to be positioned along said track opposite the carriage on the other side of said magazine, means for moving said carriages simultaneously along said track, means associated with one of said carriages for removing one of said heads from the storage position in said magazine and for inserting the head into the replacement position in said holder member on said machine frame, and means associated with the other said carriage for removing one of said heads from the replacement position in said holder member on said machine frame and inserting the working head into the storage position in said magazine.

References Cited

UNITED STATES PATENTS 3,354,761  11/1967  Sadier _____ 29—568 XR
3,286,595  11/1967  Wollenhaupt _____ 77—22 XR FRANCIS S. HUSAR, Primary Examiner U.S. Cl. X.R.

77—22